(12) United States Patent
Ochi et al.

(10) Patent No.: US 7,591,203 B2
(45) Date of Patent: Sep. 22, 2009

(54) CONTROL APPARATUS AND CONTROL METHOD FOR VEHICLE

(75) Inventors: Tatsuya Ochi, Chiyoda-ku (JP); Takashi Okada, Chiyoda-ku (JP); Hiroshi Sakamoto, Chiyoda-ku (JP); Masato Imai, Chiyoda-ku (JP); Tetsuo Matsumura, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 416 days.

(21) Appl. No.: 11/657,644

(22) Filed: Jan. 25, 2007

(65) Prior Publication Data

US 2007/0199395 A1  Aug. 30, 2007

(30) Foreign Application Priority Data

Feb. 28, 2006  (JP) .............................. 2006-053044

(51) Int. Cl.
*F16H 3/08* (2006.01)
*F16H 59/00* (2006.01)

(52) U.S. Cl. .......................................... 74/331; 74/335
(58) Field of Classification Search .................. 74/331, 74/335
See application file for complete search history.

(56) References Cited

U.S. PATENT DOCUMENTS

| 5,890,392 | A  | * | 4/1999  | Ludanek et al. .............. 74/331 |
| 6,978,691 | B2 | * | 12/2005 | Katakura ..................... 74/331 |
| 7,314,427 | B2 | * | 1/2008  | Sakai et al. ................. 477/116 |
| 7,513,848 | B2 | * | 4/2009  | Inoue et al. .................. 477/74 |
| 2007/0137339 | A1 | * | 6/2007 | Matsumura et al. ........... 74/335 |

FOREIGN PATENT DOCUMENTS

| JP | 6-221347 A | 8/1994 |
| JP | 10-318361 A | 12/1998 |

* cited by examiner

*Primary Examiner*—Dirk Wright
(74) *Attorney, Agent, or Firm*—Crowell & Moring LLP

(57) ABSTRACT

A vehicular control apparatus for a vehicle has a twin clutch type automatic transmission. The control apparatus comprises an external information acquisition apparatus for acquiring external information required for vehicular transmission control, an input section for taking in the external information from the external information acquisition apparatus; and a pre-shift gear selection section for selecting a predetermined gear train among plural gear trains of the transmission to execute a pre-shift in accordance with the external information.

10 Claims, 12 Drawing Sheets

CONTROL APPARATUS AND CONTROL METHOD FOR VEHICLE

CLAIM OF PRIORITY

The present application claims priority from Japanese application serial no. 2006-53044, filed on Feb. 28, 2006, the content of which is hereby incorporated by reference into this application.

FIELD OF THE INVENTION

The present invention relates to a vehicular control apparatus and a vehicular control method, particularly to a control for an automatic transmission.

BACKGROUND ART

In recent years, an automatic transmission comprising an automated gear type transmission is widespread in view of low fuel consumption and drivability of a vehicle. As such an automatic transmission, the so-called twin clutch type automatic transmission is widely known. The twin clutch type automatic transmission has two clutches and multiple gear trains. Any one of the two clutches are selectively connected to an engine, and any one of the multiple gear trains are selected by a gear selection apparatus, so that the selected gear train connects between an output shaft of the selected clutch and an output shaft of the transmission. Then, one of the clutches is engaged, and another is disengaged to form a desired gear position (for example, see Japanese Patent Laid-Open No. 1994-221347).

In the twin clutch type transmission, the so-called pre-shift is executed as follows to shorten a time required for shifting, and to mechanically protect a rotation synchronization mechanism. Prior to determination and execution of the next shifting, a predetermined gear selection apparatus executes the pre-shift operation that connects between the output shaft of a currently disengaged clutch (which is not driven) and the output shaft of a transmission via a predetermined gear train in order to make the next shifting (gear position) stand by while keeping a currently executed shifting. As a method for selecting a predetermined gear for executing the pre-shift, a data table having the same structure as the so-called shift line for a throttle opening and a vehicle speed, is set in advance. Then, in accordance with an amount of operation of an accelerator by a driver, an up shift prediction area or a down shift prediction area is determined to select a pre-shift gear (for example, see Japanese Patent Laid-Open No. 1998-318361).

SUMMARY OF THE INVENTION

The present invention is to keep down a delay of a shifting response due to failure in a pre-shift gear selection, by improving an accuracy of prediction about the next shifting to be pre-shift.

An automatic transmission control of the present invention is characterized in by: acquiring external information required for vehicular transmission control; and selecting a predetermined gear train among plural gear trains of the transmission for executing a pre-shift in accordance with the external information.

According to the present invention, an accuracy of prediction about shifting is improved. Thereby, a delay of a shifting response due to failure in a pre-shift gear selection can be kept down.

DETAILED DESCRIPTION OF THE PREFERRED EMBODIMENTS

This embodiment relates to a vehicular control apparatus in which a twin clutch type transmission having a function for switching between an automatic shifting mode and a manual shifting mode is mounted. Particularly, this embodiment relates to a control for the aforementioned so-called pre-shift. In reference to FIGS. 1 to 12, a control apparatus and a control method for a vehicle having a twin clutch type transmission of a first embodiment of the present invention is explained below.

In the automatic transmission, the control method can be switched with a shifting mode switch provided to a driver's seat. A shifting instruction concerning up shift/down shift is automatically produced by a program stored in a microcomputer in the automatic shifting mode. Therefore, in a case of the automatic shifting mode, a driver may not feel a pre-shift executed prior to shifting. Accordingly, even when a failure of the pre-shift occurs, for example, a down shift instruction is actually produced in spite of the fact that the pre-shift is executed as an up shift standby, the driver may not feel the fact of the delay in the shifting response due to time loss for re-engagement of the gear to be executed the shifting. On the other hand, in a case of the manual shifting mode where the shifting is executed with the shifting instruction produced by the driver's manual operation, the driver may notice the delay in the shifting response due to such a failure of the pre-shift to be a prediction of the next shifting. Accordingly, in the manual shifting mode, an uncomfortable driving feeling may be given to the driver. This embodiment proposes a vehicle control apparatus having means to keep down the delay in the shifting response.

Figure 1:
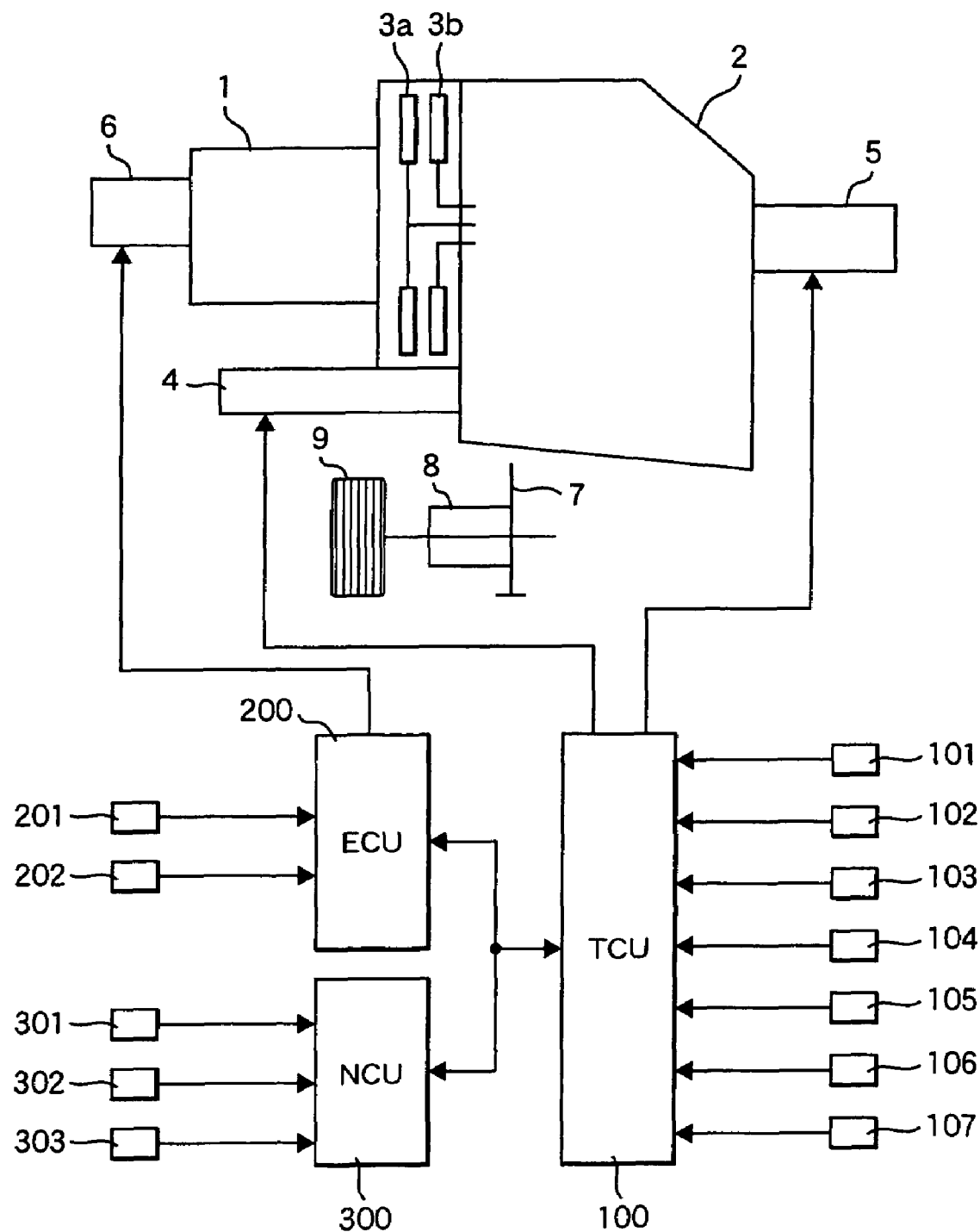
FIG. 1 is a system structure diagram showing a main portion of a vehicular control apparatus for a vehicle having a twin clutch type transmission of a first embodiment of the present invention.

FIG. 1 is a system structure view of a main portion of the control apparatus for the vehicle having the twin clutch type transmission applied in the first embodiment of the present invention. In FIG. 1, an engine 1 as a driving power source, a gear type transmission 2, a first clutch 3a, a second clutch 3b, a final gear 7, a differential gear 8, and a driving wheel 9 is shown.

The first clutch 3a is used for gear trains of even gear trains (2nd gear position, 4th gear position, and 6th gear position) and a reverse gear position, in the gear type transmission 2 comprising forward six gear positions and one reverse gear position. The second clutch 3b is connected to odd gear trains (1st gear position, 3rd gear position, and 5th gear position). Driving torque from the engine 1 is given to the gear type transmission 2 via the first clutch 3a or second clutch 3b. Then, the torque is transferred from the final gear 7 and differential gear 8 to the driving wheel 9 via a predetermined gear train and a shaft corresponding to a selected gear position. The gear type transmission is explained later in detail.

As shown in FIG. 1, a structure of the electronic system includes a transmission control apparatus 100, an engine control apparatus 200, and a navigation control apparatus 300. The three control apparatuses execute various information exchange through two-way data communications.

The transmission control apparatus 100 is equipped with an accelerator position sensor 101, a speed sensor 102 for clutch-output shaft, a speed sensor for a transmission output (vehicle speed sensor) 103, a shift position sensor (gear position sensing means) 104, a brake switch 105, a shift lever switch 106, a mode switch 107, a clutch actuator 4, and a shift actuator 5. The accelerator position sensor 101 senses an amount of an operation of an accelerator by a driver, and outputs the sensed signal to the transmission control apparatus 100. The clutch output shaft-speed sensor 102 senses an output shaft speed of the first clutch 3a and an output shaft speed of the second clutch 3b, and outputs the sensed signals to the transmission control apparatus 100. The transmission output shaft-speed sensor 103 senses a speed of the output shaft of the gear type transmission 2, and outputs the sensed signal to the transmission control apparatus 100. The shift sensor 104 senses a shift position for forming a predetermined gear position by use of the shift actuator 5, and outputs the sensed signal to the transmission control apparatus 100. The brake switch 105 senses whether a driver operates a brake, and outputs the sensed signal to the transmission control apparatus 100. The shift lever switch 106 senses a position of a shift lever operated by the driver, e.g., in a case of switching between forward and reverse, and outputs the sensed signal to the transmission control apparatus 100. The shifting mode switch 107 senses an automatic shifting mode or a manual shifting mode selected by the driver, and outputs the sensed signal to the transmission control apparatus 100. The clutch actuator 4 performs engagement and disengagement of the first clutch 3a and the second clutch 3b respectively in accordance with a control instruction from the transmission control apparatus 100, so that power from the engine 1 is transferred and interrupted to the output shaft of the transmission. Further, the clutch actuator 4 switches torque between both clutches to achieve shifting while the vehicle is traveling.

The shift actuator 5 is the above-described gear selection apparatus. In accordance with a control instruction from the transmission control apparatus 100, the shift actuator 5 selectively operates a 1st-3rd shift fork (not shown), a 5th shift fork (not shown), a 2nd-4th shift fork (not shown), and a 6th-reverse shift fork (not shown). Thereby, the clutch-output shaft and the transmission-output shaft are connected to each other to form a predetermined gear position. A predetermined gear train connected to a non-driven side is operated prior to an execution of the next shifting to achieve the pre-shift.

The engine control apparatus 200 is equipped with an accelerator position sensor 201, a throttle opening sensor 202, and an electronic throttle device 6. The accelerator position sensor 201 senses an amount of an operation of an accelerator by the driver, and outputs the sensed signal to the engine control apparatus 200. The throttle opening sensor 202 senses an opening of a throttle valve of the electronic throttle device 6, and outputs the sensed signal to the engine control apparatus 200. The electronic throttle 6 controls the opening of the throttle valve provided to an engine intake system in accordance with a control instruction from the engine control apparatus 200. The transmission control apparatus 100 sends a required-torque instruction to the engine control apparatus 200. The engine control apparatus 200 operates the electronic throttle device 6 or changes an ignition timing in accordance with the received required-torque instruction. Accordingly, driving torque generated by the engine 1 can be controlled.

The navigation control apparatus 300 is equipped with a direction sensor 301, a GPS sensor 302, and a vehicle speed sensor 303. The direction sensor 301 senses a direction of a vehicle, and outputs the sensed signal to a navigation control apparatus 300. The GPS sensor 302 senses a GPS signal from a GPS satellite (not shown), and outputs the sensed signal to the navigation control apparatus 300. The vehicle speed sensor 303 senses a rotation speed of a wheel, and outputs the sensed signal to the navigation control apparatus 300. The navigation control apparatus 300 calculates a current position where a vehicle is traveling, through a known method by use of the signals of the above sensors. Various map information stored in a storage section built in the navigation control apparatus 300, such as a radius of curvature and road gradient at the current position on a vehicle path, is read, and sent to the transmission control unit 100 by use of the two-way data communications.

The transmission control unit 100 controls the shift actuator 5 prior to the next shifting, by use of the map information corresponding to a current position calculated in the navigation control apparatus 300, to execute the pre-shift.

The main portion of the control apparatus for the vehicle including the twin clutch type transmission is structured as described above, so that an accuracy of prediction about shifting in the manual shifting mode can be improved, and a delay of shifting due to failure in the pre-shift gear selection can be kept down.

Figure 2:
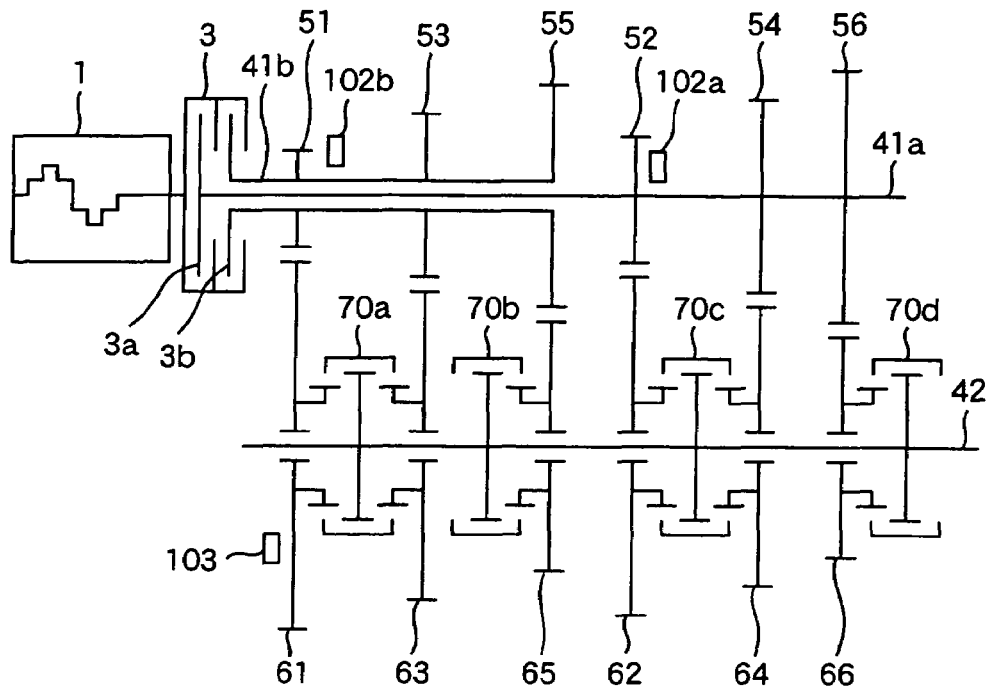
FIG. 2 is a skeleton diagram showing the twin clutch type transmission of the first embodiment of the present invention.

FIG. 2 is a skeleton diagram showing the twin clutch type transmission of the first embodiment of the present invention. The engine 1 is directly connected to the clutches 3 with a twin clutch 3a, 3b. The first clutch 3a is connected to its output shaft 41a directly. The second clutch 3b is connected to its output shaft 41b directly. The second clutch-output shaft 41b is made of a hollow shaft. The first clutch-output shaft 41a is put through the hollow portion of the second clutch output shaft 41b, and can rotate without relation of the second clutch output shaft 41b. A 2nd drive gear 52, a 4th drive gear 54, and a 6th drive gear 56 are fixed on the first clutch-output shaft 41a to be an input shaft of the transmission, and these gears are capable of rotating together with the first clutch-output shaft 41a without relation of the second clutch-output shaft 41b. A 1st drive gear 51, a 3rd drive gear 53, a 5th drive gear 55, and a reverse drive gear (not shown) are fixed to the second clutch output shaft 41*b*, and these clutches are capable of rotating without relation of the first output shaft 41*a*. A first clutch-speed sensor 102*a* is attached to the 2nd drive gear 52 to sense a speed of its output shaft. A second clutch speed sensor 102*b* is attached to the 1st drive gear 51 to sense a speed of its output shaft.

A 1st driven gear 61, a 2nd driven gear 62, a 3rd driven gear 63, a 4th driven gear 64, a 5th driven gear 65, a 6th driven gear 66, and a reverse driven gear (not shown) are mounted freely on the transmission-output shaft 42. A first mesh clutch 70*a* having a rotation synchronization mechanism is provided between the 1st driven gear 61 and the 3rd driven gear 63. The shift actuator 5 (not shown) is controlled to operate the 1st-3rd shift fork for moving the first mesh clutch 70*a* in the left and right directions. Accordingly, the 1st driven gear 61 or 3rd driven gear 63 can be connected to the transmission-output shaft 42. Rotation torque transferred from the 1st drive gear 51 or 3rd drive gear 53 to the 1st driven gear 61 or 3rd driven gear 63 is transferred to the transmission-output shaft 42 via a first mesh clutch 70*a*.

Similarly, a second mesh clutch 70*b* for the 5th driven gear 65 is provided on the output shaft 42. The shift actuator 5 (not shown) is controlled to operate the 5th shift fork for moving the second mesh clutch 70*b* in the right direction. Accordingly, the 5th driven gear 65 can be connected to the output shaft 42. A third mesh clutch 70*c* is provided between the 2nd driven gear 62 and 4th driven gear 64. The shift actuator 5 (not shown) is controlled to operate the 2nd-4th shift fork for moving the third mesh clutch 70*c* in the left and right directions. Accordingly, the 2nd driven gear 62 or 4th driven gear 64 can be connected to the output shaft 42. A forth mesh clutch 70*d* is provided between the 6th driven gear 66 and reverse driven gear (not shown). The shift actuator 5 (not shown) is controlled to operate the 6th-reverse shift fork for moving the forth mesh clutch 70*d* in the left and right directions. Accordingly, the 6th driven gear 66 or reverse driven gear can be connected to the output shaft 42.

The output shaft speed sensor 103 is provided to the 1st driven gear 61, and senses a speed of the transmission-output shaft 42.

In the above transmission control apparatus 100, when a predetermined gear position is selected for a pre-shift by a pre-shift gear selection section, the shift actuator 5 selects the corresponding shift fork to operate one of the above mesh clutches. Thereby, the pre-shift is achieved. In this state, when a shifting instruction is produced in the transmission control apparatus 100, it is determined whether the operation of the corresponding mesh clutch is complete. When the operation is complete, the clutch actuator 4 is operated to the engagement and disengagement for the first clutch 3*a* and second clutch 3*b*. Then, actual shifting is executed.

Figure 3:
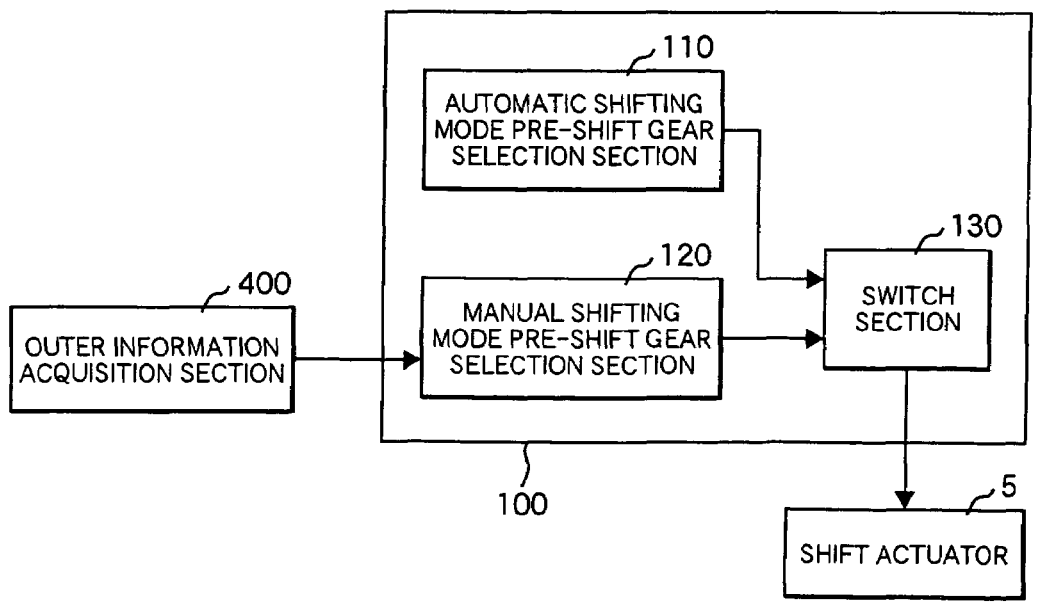
FIG. 3 is a control block diagram showing a transmission control apparatus 100 of the first embodiment of the present invention.

FIG. 3 is a control block diagram showing a main portion of the transmission control apparatus 100 of the first embodiment of the present invention.

Figure 4:
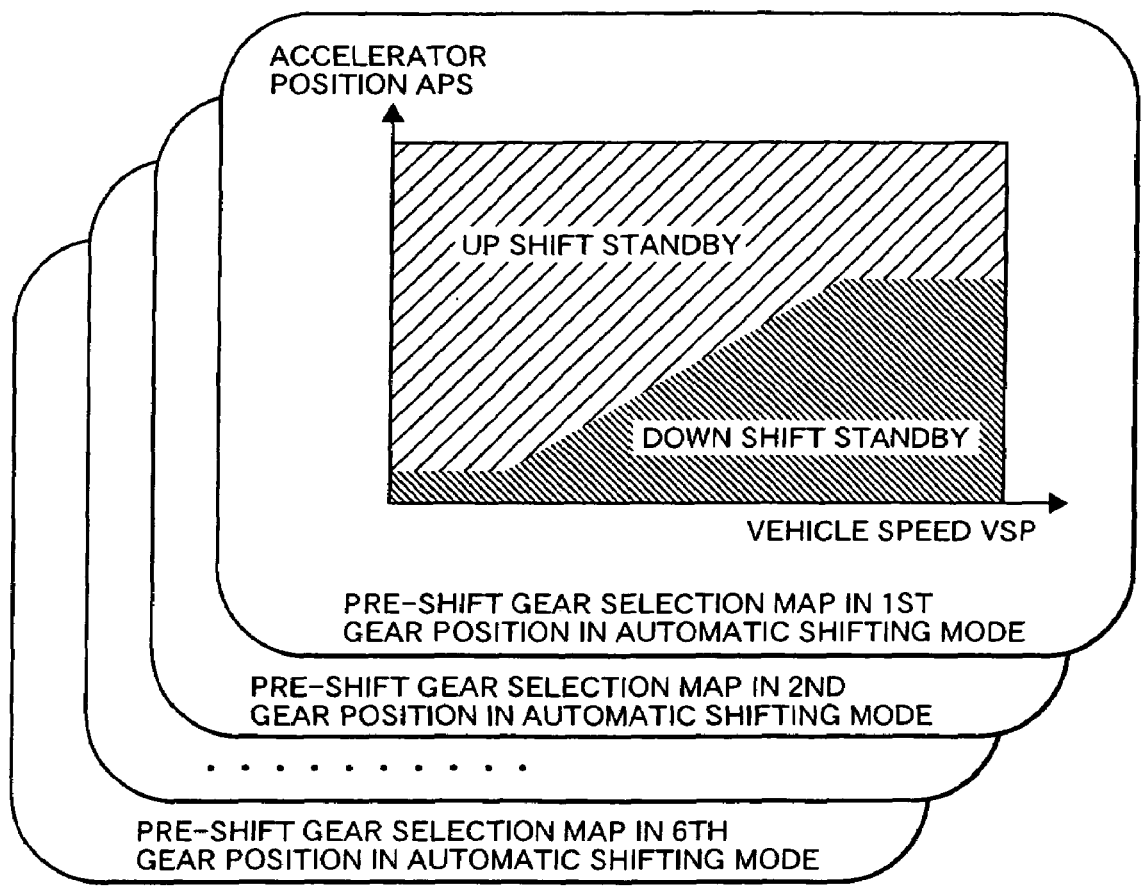
FIG. 4 is a schematic diagram of a data map for a pre-shift gear selection for an automatic shifting mode.

The transmission control apparatus 100 comprises a pre-shift gear selection section 110 for an automatic shifting mode, a pre-shift gear selection section 120 for a manual shifting mode, and a selection switch section 130. The automatic shifting mode pre-shift gear selection section 110 selects a pre-shift gear position for the automatic shifting mode in accordance with an accelerator position APS sensed by the accelerator position sensor 101 and a vehicle speed VSP calculated from a signal sensed by the transmission output shaft speed sensor 103. Concretely, as shown in FIG. 4, by use of a data map having a horizontal axis for the vehicle speed VSP and a vertical axis for the accelerator position APS, it is determined whether a driving area is one where an up shift standby or a down shift standby is to be executed. Namely, when a driver depresses an accelerator pedal, it is determined that the driving area is in an up shift standby area. When a driver does not depress the accelerator pedal, it is determined that the driving area is in a down shift standby area. The above data map can be set for each current gear position of the driving shaft separately. The above current gear position is determined in the transmission control apparatus 100 by use of a signal of the shift position sensor 104.

The manual shifting mode pre-shift gear selection section 120 shown in FIG. 3 selects a pre-shift gear position in accordance with external information acquired in an external information acquisition section 400.

The external information acquisition section 400 comprises the navigation control apparatus 300, but it is not limited to the navigation control apparatus 300. The external information acquisition section 400 may comprise, e.g., a radar apparatus for measuring a distance between one's own vehicle and the one ahead, and a camera apparatus for taking in an image of a surrounding of a vehicle, or a communications section for communicating with an external of the vehicle. The above external information may comprise a radius of curvature, a load gradient, a distance between one's own vehicle and the one ahead, or information about a freezing road. As one example, by use of a data map having a horizontal axis for the vehicle speed VSP and a vertical axis for a radius of curvature Rc, it is determined whether a driving area is in the up shift standby area or down shift standby area. Namely, regardless of an accelerator operation by a driver, when a radius of curvature is small, it is determined that the driving area is in the up shift standby area, and when a radius of curvature is large, it is determined that a driving area is in the down shift standby area. The above data map can be set for each current gear position of the driving shaft separately.

Figure 6:
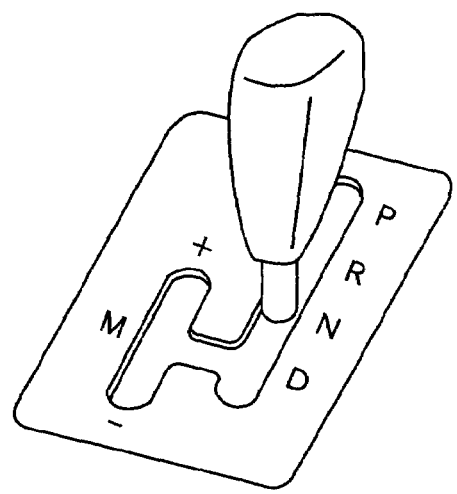
FIG. 6 is an external view of shifting mode switch means 105 of the first embodiment of the present invention.

The selection switch section 130 shown in FIG. 3 decides whether to adopt either computation method by the automatic transmission mode pre-shift gear selection section 110 or the manual transmission mode pre-shift gear selection section 120. Concretely, in accordance with a signal sensed in the shifting mode switch 106 contained in a shift lever provided to a driver's seat, as shown in FIG. 6, the computation method of the pre-shift gear selection means is switched. As shown in FIG. 6, the shift lever comprises a P range for parking a vehicle, an R range for reversing the vehicle, an N range in which the vehicle is not driven, and a D range for forwarding the vehicle. When a driver wants to execute shifting, an M range can be selected. The shift lever is operated as described above to input a signal of the mode switch 106 (not shown) contained in the shift lever to the transmission control apparatus 100, so that the shifting mode is switched between the automatic shifting mode and manual shifting mode.

The main portion of the transmission control apparatus 100 is structured as described above, so that an accuracy of prediction about shifting can be improved, and a delay of shifting due to failure of the pre-shift selection can be kept down.

In this embodiment, the radius of curvature Rc received from the navigation control apparatus 300 although is used as a condition for selecting gear to be used for the pre-shift in the above manual shifting mode, such information used for the pre-shift gear selection is not limited to it. For example, the navigation control apparatus 300 calculates a distance from a present location to an approaching road curve, which has a radius of curvature equal to or under a predetermined value, and the distance may be used as the condition for selecting gear to be used for the pre-shift. Furthermore, instead of using the navigation system, a radius of curvature in a road under vehicle traveling may be obtained by a camera apparatus, and a value of the radius of curvature may be used for selecting gear to be used for the pre-shift. As such a camera apparatus, a vehicle mounted camera for originally taking in an image concerning a scene ahead of the vehicle may be adopted.

Furthermore, instead of them, information from a vehicle mounted radar apparatus, which originally is used for measuring a distance between one's own vehicle and the one ahead vehicle, may be adopt for the pre-shift.

Figure 7:
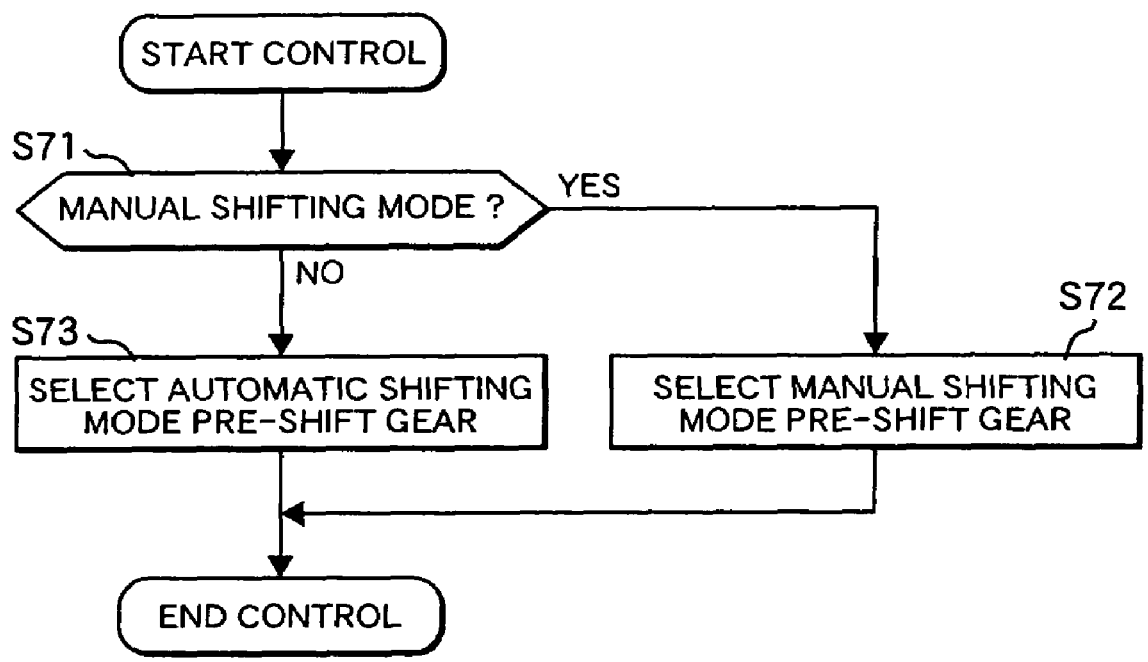
FIG. 7 is a flowchart showing main processes of the transmission control apparatus 100 of the first embodiment of the present invention.
Figure 8:
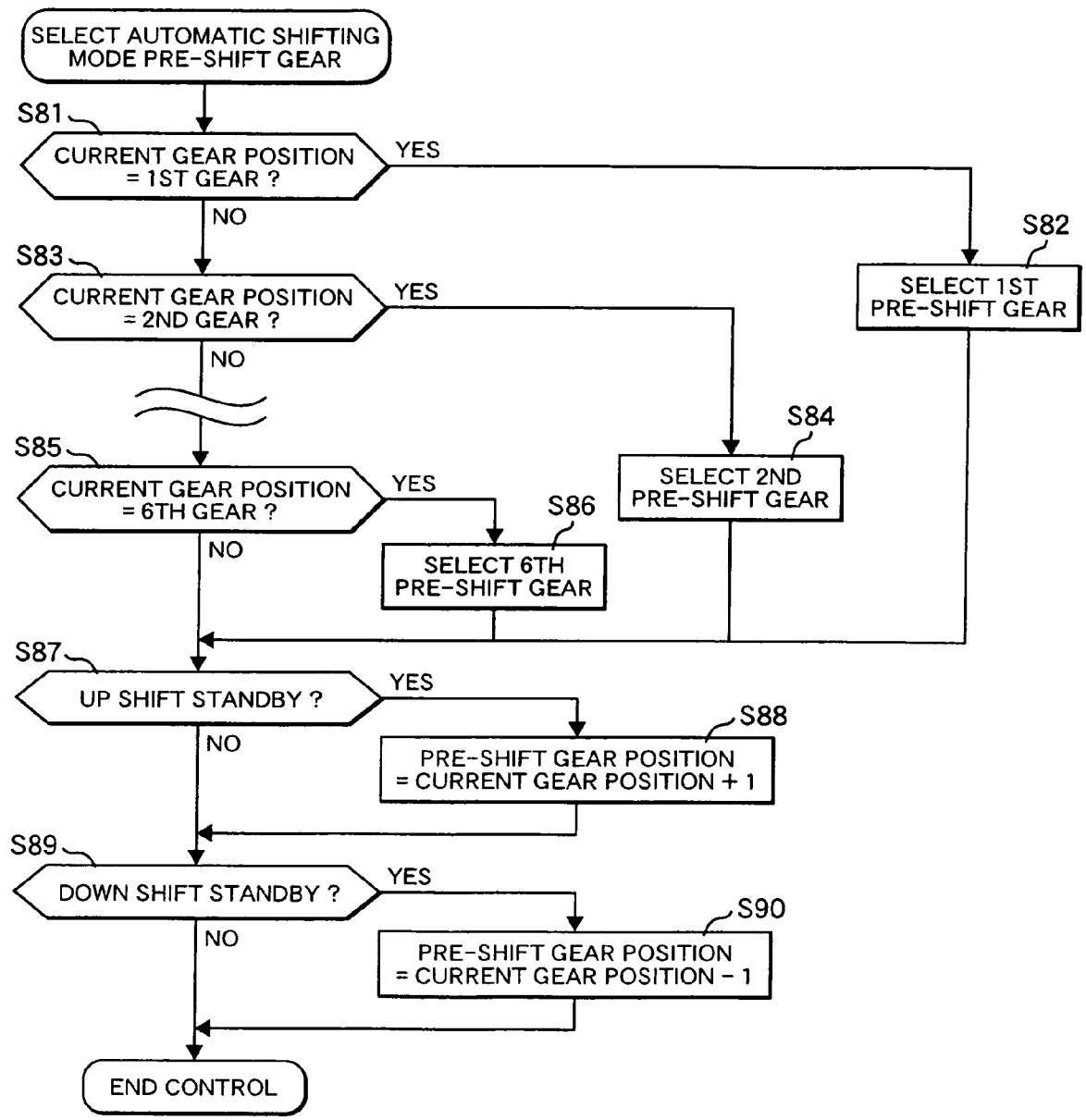
FIG. 8 is a flowchart explaining a pre-shift gear selection section in the automatic shifting mode.

FIG. 7 is a flowchart showing main processes of the transmission control apparatus 100 of the first embodiment of the present invention. In Step S71, a signal of the mode switch 106 is took in to determine whether the shifting mode selects the automatic shifting mode. When the determination is YES, the flow goes to Step S72. Then, a process in Step 72 is executed. When the determination is NO, the flow goes to Step S73. Then, a process in Step 73 is executed. In Step S72, a pre-shift gear is selected for the automatic shifting mode as shown in FIG. 4. A pre-shift gear position is selected in accordance with an accelerator operation by a driver. Concrete processes of the automatic shifting mode pre-shift gear selection executed in Step S72 are explained in reference to FIG. 8. FIG. 8 is a flowchart for the automatic shifting mode pre-shift gear selection. In Step S81, it is determined whether a current gear position of a currently traveling vehicle is in the 1st gear position. The current gear position is determined by use of a signal sensed in the shift position sensor 104. When the determination is YES, the flow goes to Step S82. When the determination is NO, the flow goes to Step S83. In Step S82, in accordance with a data map for the 1st gear, it is determined whether a driving area is in the up shift area or down shift area. In Step 83, it is determined whether the current gear position is in the 2nd gear position. When the determination is YES, the flow goes to Step S84 to determine when the driving area is in the up shift area or down shift area in accordance with a data map for the 2nd gear position. The same processes as above are executed for 3rd to 6th gear positions. In Step S87, it is determined whether to execute the up shift standby. When the determination is YES, the flow goes to Step S88. When the determination is NO, the flow goes to Step S89. In Step S88, the pre-shift gear position is calculated by incrementing the current gear position. In Step S89, it is determined whether to execute the down shift standby. When the determination is YES, the flow goes to Step S90 to calculate the pre-shift gear position calculated by decrementing the current gear position. Then, the processes of the automatic shifting mode pre-shift gear selection are complete.

Figure 5:
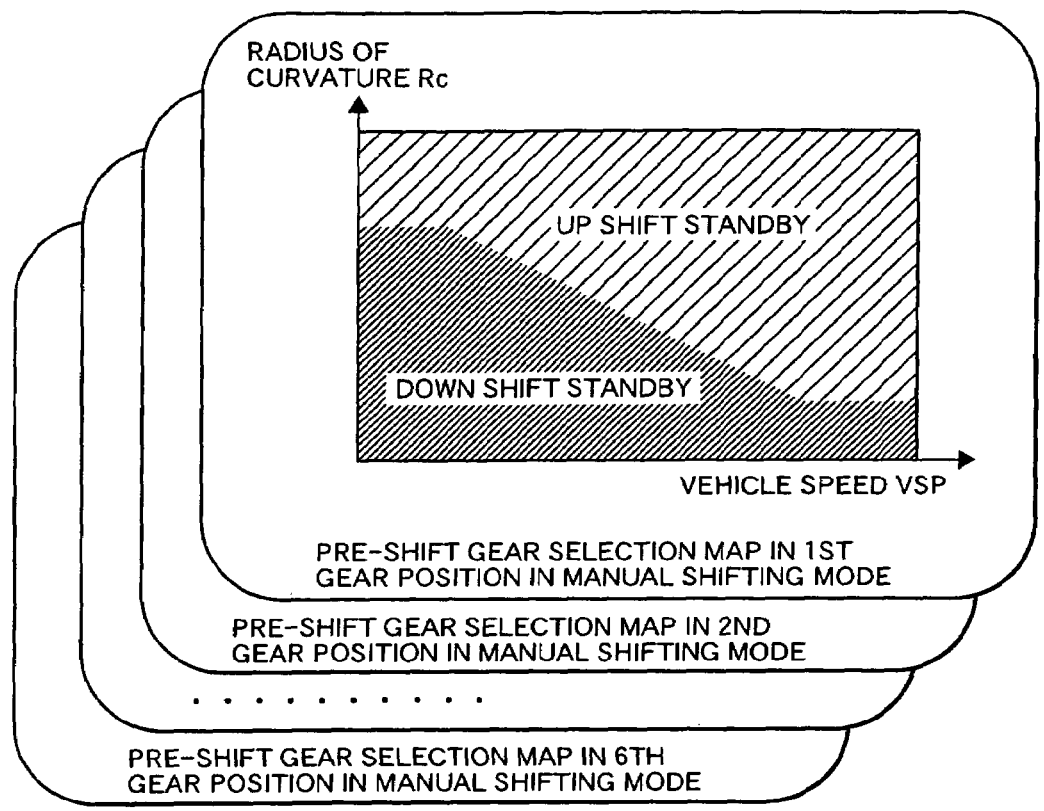
FIG. 5 is a schematic diagram of a data map for a pre-shift gear selection for a manual shifting mode.
Figure 9:
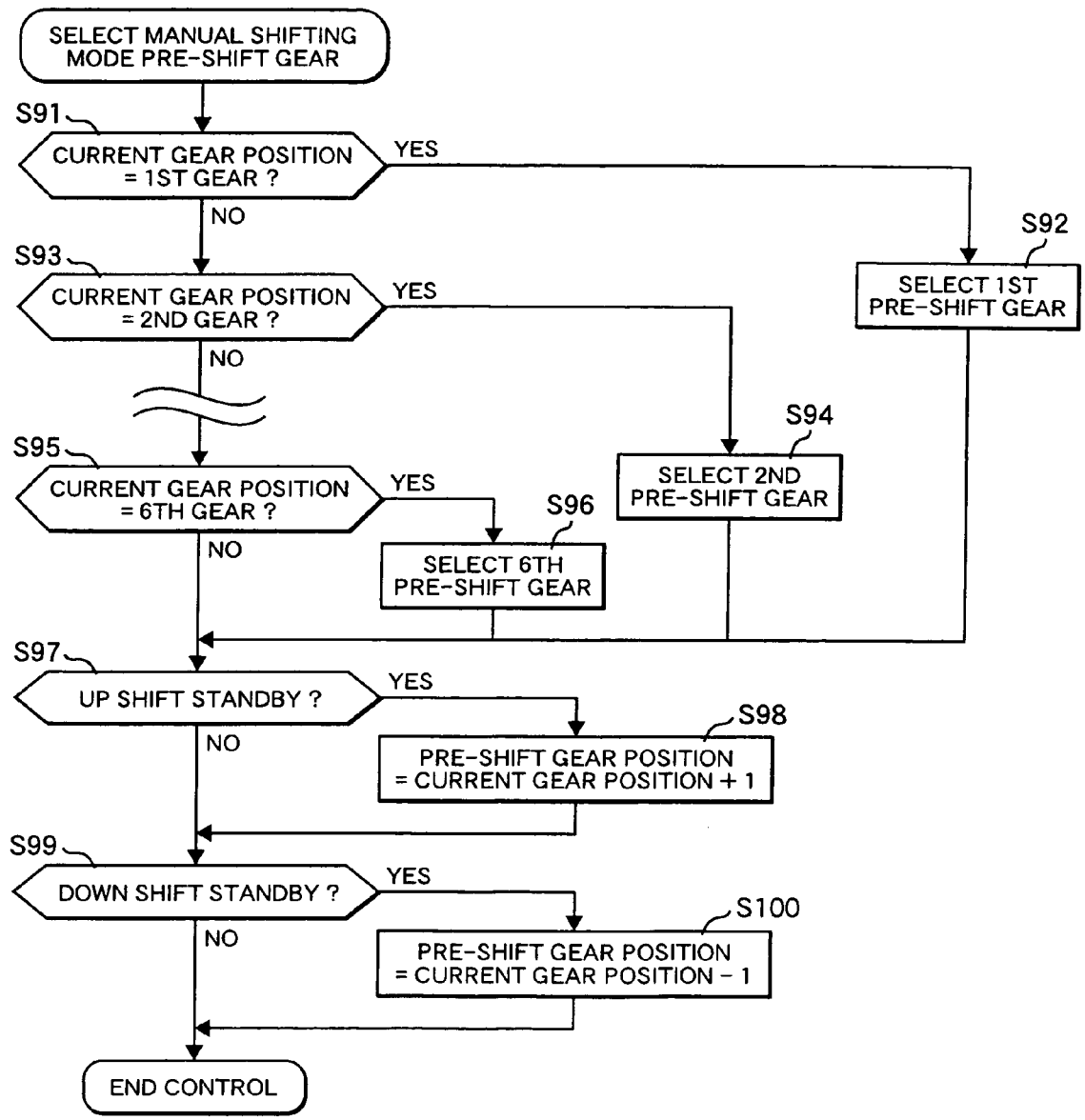
FIG. 9 is a flowchart explaining a pre-shift gear selection section in the manual shifting mode.
Figure 10A:
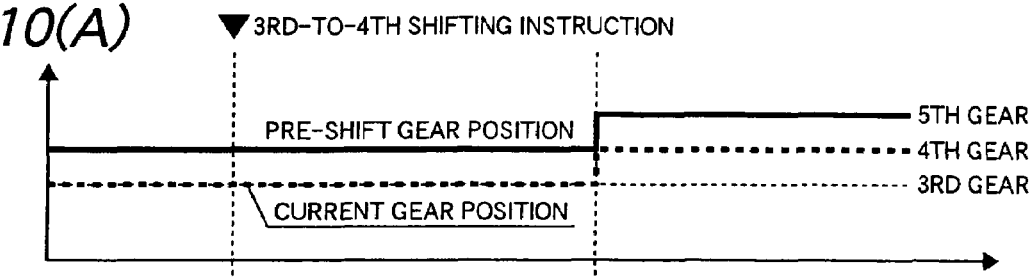
FIG. 10 is a time chart explaining a main portion of a control of the transmission control apparatus 100.
Figure 10B:
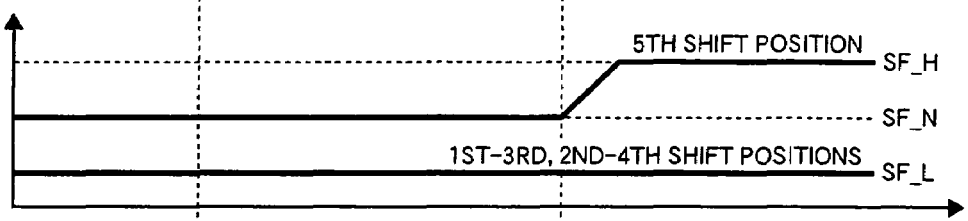
Figure 10C:
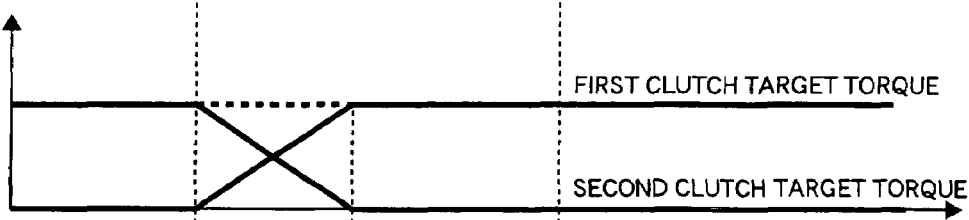
Figure 10D:
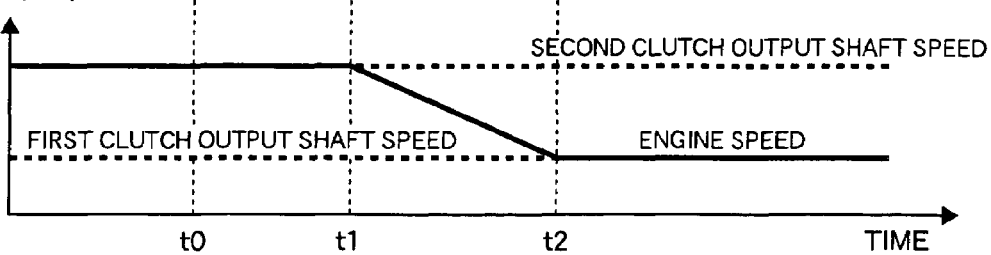
Figure 11A:
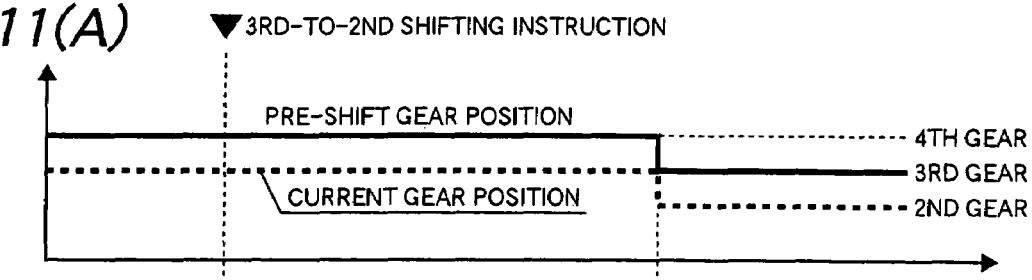
FIG. 11 is a time chart explaining a main portion of a control of the transmission control apparatus 100.
Figure 11B:
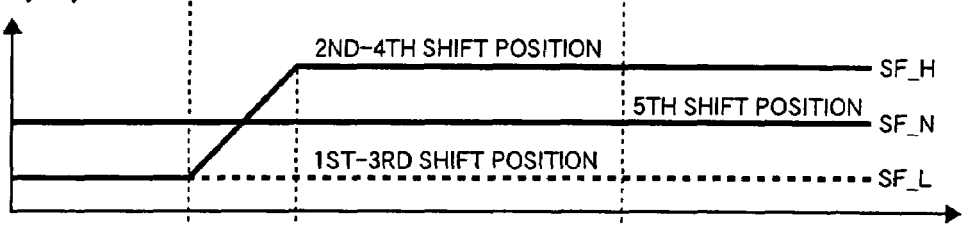
Figure 11C:
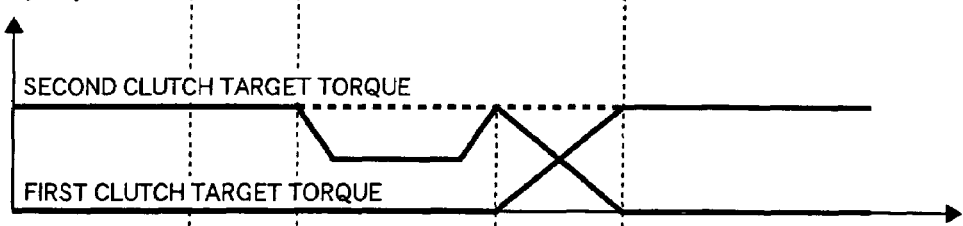
Figure 11D:
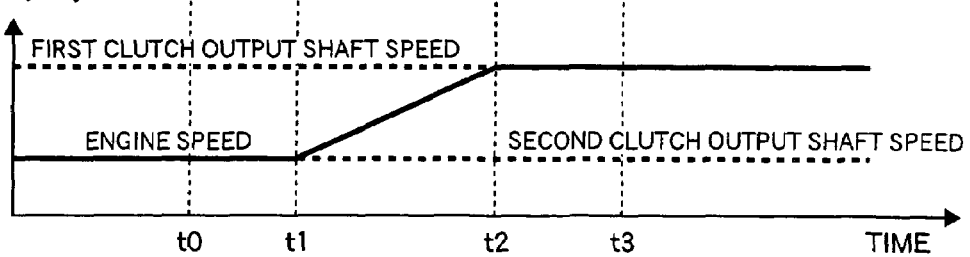
Figure 12A:
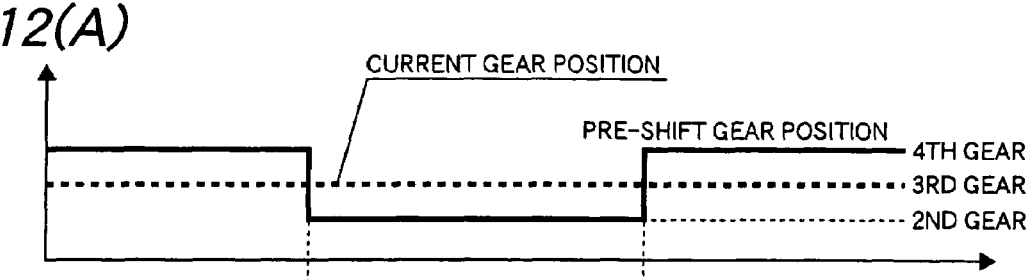
FIG. 12 is a time chart explaining a main portion of a control of the transmission control apparatus 100.
Figure 12B:
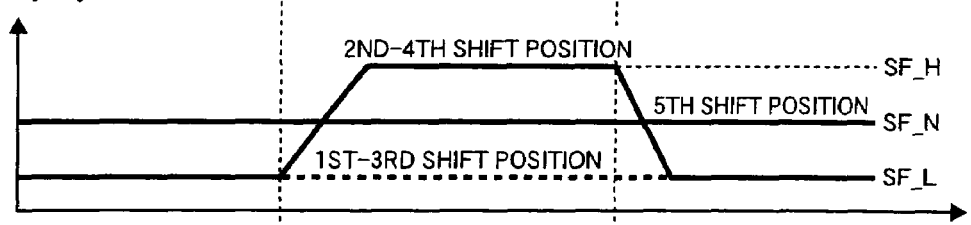
Figure 12C:
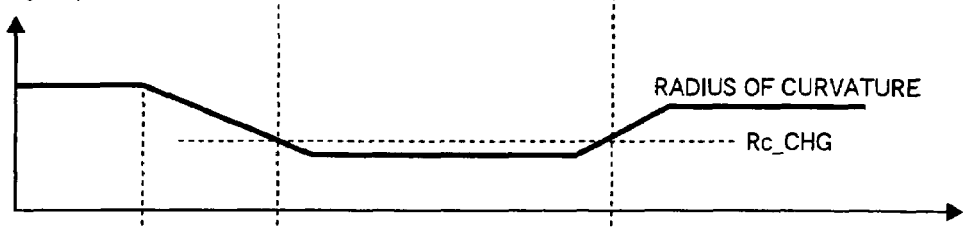
Figure 12D:
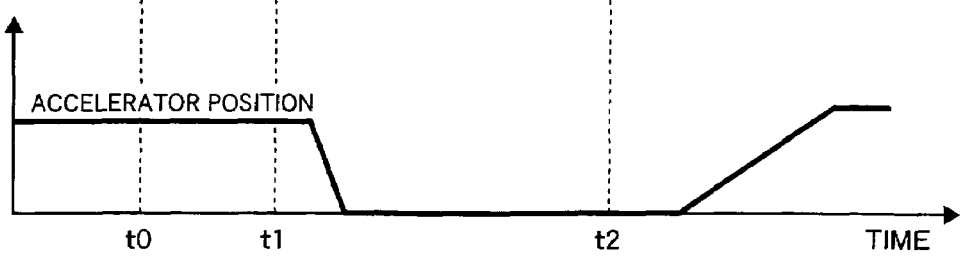

A concrete process of the manual shifting mode pre-shift gear selection corresponding to a process of Step S73 shown in FIG. 7 is explained in reference to FIG. 9. FIG. 9 is a flowchart of the manual shifting mode pre-shift gear selection means. This process flow uses the same process form as the automatic shifting mode. In this process flow, a current gear position is determined, and it is determined whether the pre-shift gear position in the manual shifting is in a position for the up shift standby or down shift standby by use of a data map for each gear position. The concrete data maps in the manual shifting mode are structured as shown in FIG. 5. For example, it is determined whether a driving area is in the up shift standby area or down shift standby area in accordance with a radius of curvature of a traveling rode. In Steps S97 to S100, the current gear position is incremented in the case of the up shift standby, and the current gear position is decremented in the case of the down shift standby. The pre-shift gear position is calculated as described above, and the process flow for the manual shifting mode pre-shift gear selection ends.

The main process of the transmission control apparatus 100 is structured as shown in FIGS. 7 to 9, so that the an accuracy of prediction of shifting in the manual shifting mode can be improved, and a delay of the shifting due to failure of the pre-shift gear selection can be kept down.

FIG. 10 is a time chart explaining a main portion of a control of the transmission control apparatus 100 when a pre-shift gear is selected properly.

In FIG. 10, (A) shows a current gear position and a pre-shift gear position; (B) shows a shift position sensed by the shift position sensor 104 attached to the above-described each shift fork; (C) shows a target torque instruction of the first clutch 3a and the second clutch 3b; and (D) shows an engine speed and the two clutch output shaft speeds.

FIG. 10 shows that a 3rd-to-4th up-shift instruction is issued at a time t0 when a current gear position is in the 3rd gear position, and a pre-shift gear position is in the 4th gear position because of the determination of executing the up shift. When the 3rd-to-4th shifting instruction is issued at the time t0, so-cold clutch to clutch is executed, namely the clutches are switched at the same time as the issue of the shifting instruction, and the shifting is done promptly, because the pre-shift gear is selected properly. Then the target torque of the second clutch 3b having been used for the driving shaft until now is decreased, and the target torque of the first clutch 3a for having been used for the non-driving shaft until now is increased. Then, the clutch to clutch operation is completed. When the switch of the clutches is completed at a time t1, the engine speed changes toward a speed of the first clutch output shaft because the engine speed is restrained by a speed of the first clutch 3a. When the first clutch output shaft reaches the engine speed at a time t2, the shifting operations are completed. During from the time t0 to time t2, as the shifting is being controlled, an update of the pre-shift gear position is prohibited. When the shifting is complete at the time t2, the pre-shift gear position is updated from the 4th gear position to 5th gear position. Then, to form the 5th gear position for the pre-shift, the 5th shift position is rendered from a neutral position (SF_N) to a 5th engagement position (SF_H). As described above, when the pre-shift gear is selected properly, a shifting response is not delayed.

FIG. 11 is a time chart explaining the main portion of a control of the transmission control apparatus 100 when the pre-shift gear is incorrectly selected. The content of (A) to (D) in FIG. 11 is the same as that in FIG. 10. FIG. 11 shows a case where a down shift instruction from the 3rd gear position to 2nd gear position is issued at the time t0 in spite of the fact that the pre-shift gear position is in the 4th gear position because of the determination of up shift. When a 3rd-to-2nd shifting instruction is issued at the time t0, the 2nd-4th shift position is switched from a 4th engagement position (SF_L) to a 2nd engagement position (SF_H) because the pre-shift gear has been incorrectly selected. When it is determined that the gear engagement is complete at the time t1, the clutches are operated to start actual shifting. First, target torque of the second clutch 3b having been used for the driving shaft until now is decreased, and the engine speed is increased. When it is determined that the engine speed has increased to a speed corresponding to the 2nd gear at the time T2, target torque of the second clutch 3b is decreased, and target torque of the first clutch 3a having been used for the non-driving shaft until now is increased. Then, the clutches are switched, so called clutch to clutch is executed. When it is determined that operation of clutch to clutch is completed at the time t3, the pre-shift gear position is updated from the 4th gear position to 3rd gear position. As the 1st-3rd shift position has been already in the 3rd gear engagement position (SF_L), the 1st-3rd shift position does not change. When the pre-shift gear is incorrectly selected, the actual shifting can not start during from the time t0 to t1. Therefore, the shifting response is delayed to make a driver feel uncomfortable.

FIG. 12 is a time chart explaining the main portion of a control of the transmission control apparatus 100 when a pre-shift gear is selected in the manual shifting mode. In FIG. 12, (A) shows a current gear position and a pre-shift gear position, (B) shows a shift position sensed by the shift sensor 104 attached to each of the above shift forks, (C) shows a radius of curvature of a traveling road (the radius of curvature is calculated in the navigation control apparatus 300), and (D) shows an accelerator position, which is an amount of an operation of accelerator by a driver, the amount being sensed in the accelerator position sensor 101. FIG. 12 is a time chart indicating that a vehicle enters and passes a curved section of a road when a current position is in the 3rd gear position, and a pre-shift gear position is in the 4th gear position because of the determination of executing the up shift. At the time t0, a radius of curvature is decreased, and the vehicle is approaching the curved section ahead. It is determined that the radius of curvature is under Rc_CHG, which is a border between the up shift standby area and the down shift standby area shown in FIG. 5, at the time t1. Then, the pre-shift gear position is updated from the 4th gear position to 2nd gear position. The 2nd-4th gear shift position is rendered from a 4th engagement position (SF_L) to 2nd engagement position (SF_H) to execute the down shift standby. Namely, the down shift standby is executed before the driver determines to enter the curved section and operates the accelerator to decelerate the vehicle. Next, when it is determined that the radius of curvature is over the Rc_CHG at the time t2 at which the vehicle passes the curved section, the pre-shift gear is updated from the 2nd gear position to 4th gear position. The 2nd-4th shift position is rendered from the 2nd engagement position (SF_H) to 4th engagement position (SF_L) to execute the up shift standby. Namely, the up shift standby is executed before the driver determines to pass the curved section and operates the accelerator to accelerate the vehicle again.

The transmission control apparatus 100 is controlled as described above, so that an accuracy of prediction about the shifting in the manual shifting mode can be improved, and a delay of the shifting due to failure of the pre-shift selection can be kept down.

Figure 13:
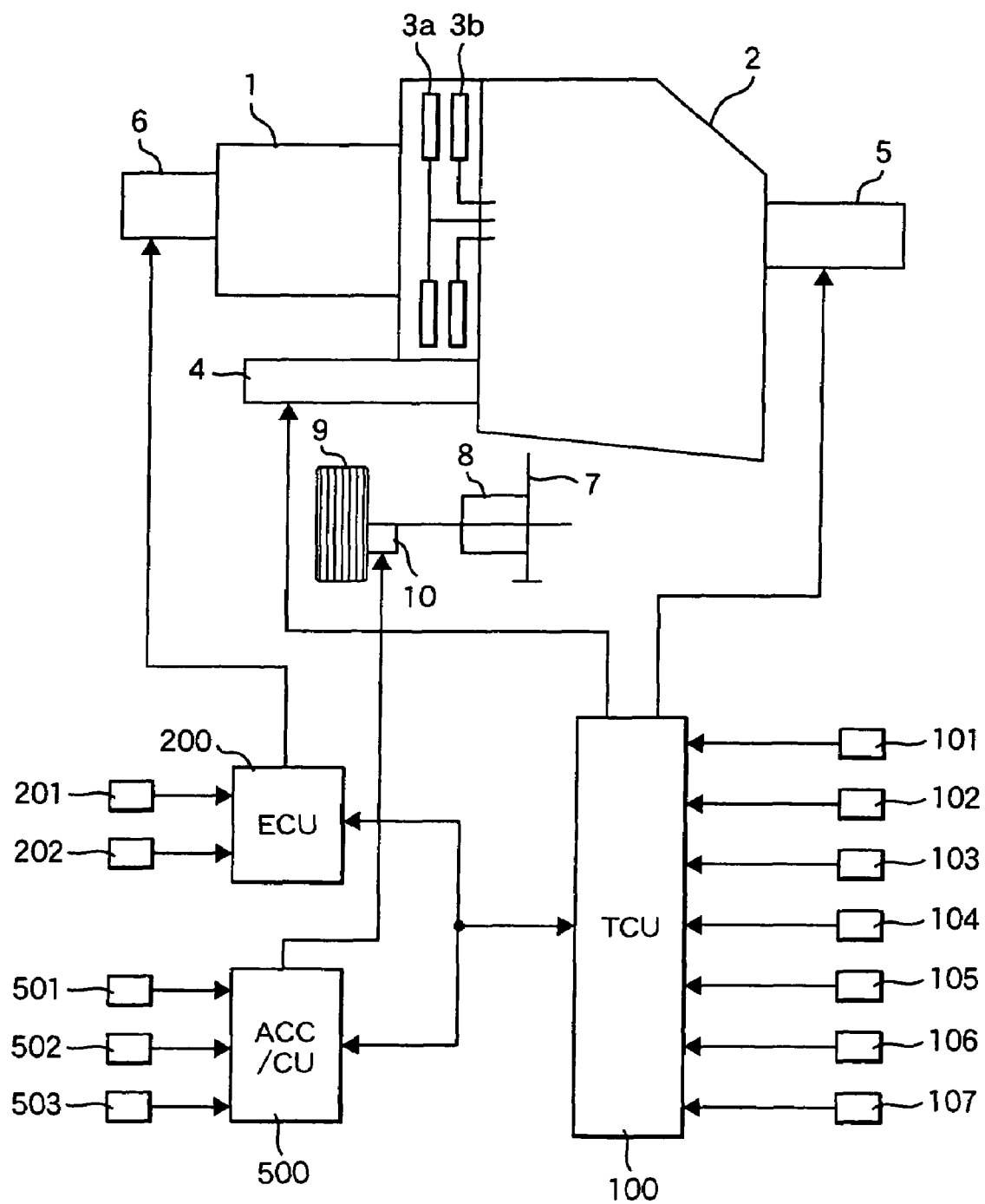
FIG. 13 is a system structure diagram showing a main portion of a vehicular transmission control apparatus for a vehicle having a twin clutch type transmission of a second embodiment of the present invention.
Figure 14:
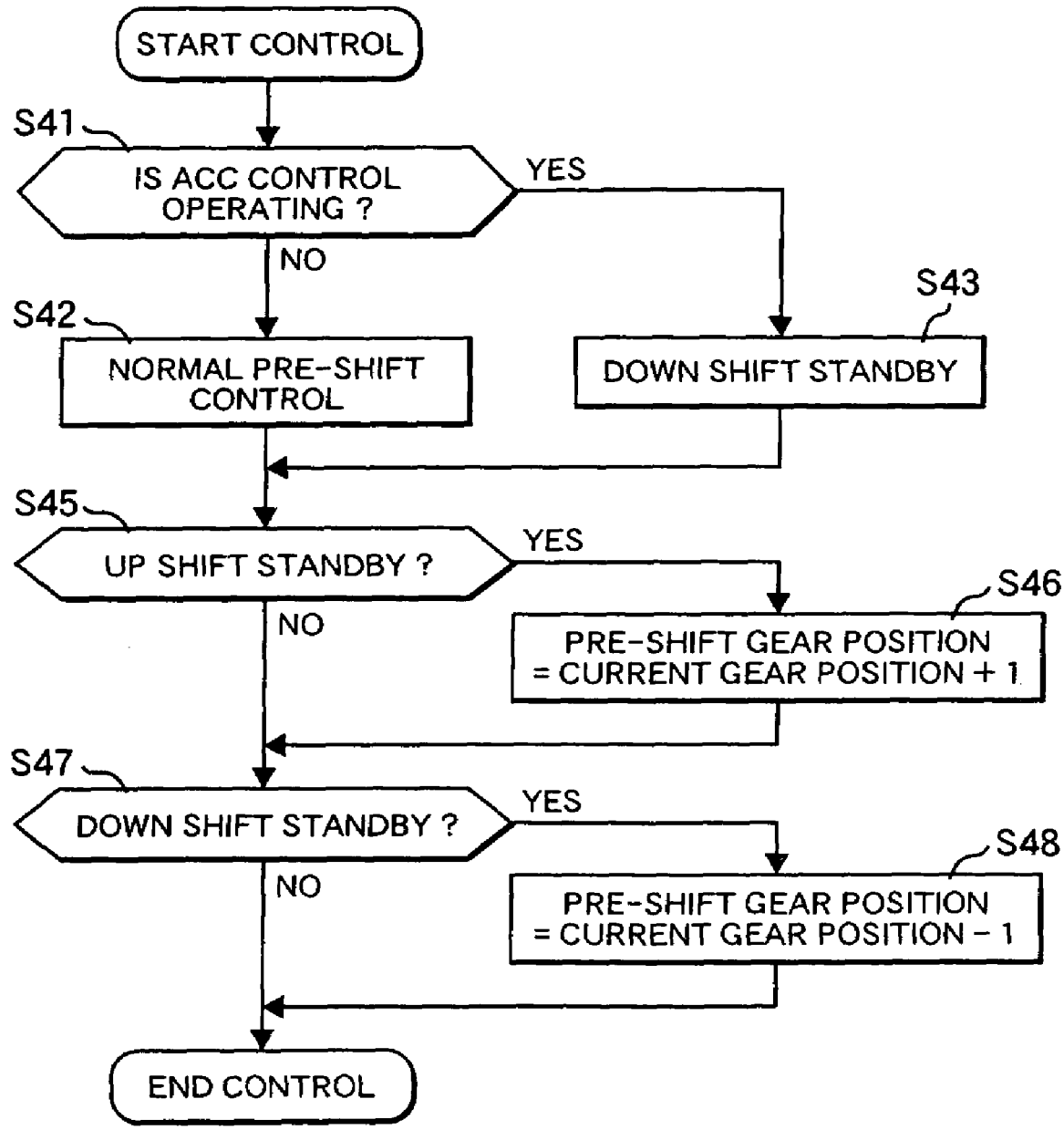
FIG. 14 is a flowchart showing main processes of the transmission control apparatus 100 of the second embodiment of the present invention.

In reference to FIGS. 13 to 14, a vehicular control apparatus and a control method for a vehicle having a twin clutch type transmission of a second embodiment of the present invention.

FIG. 13 is a system structure diagram showing a main portion of the vehicular control apparatus for the vehicle having the twin clutch type transmission of the second embodiment of the present invention. The system structure diagram of FIG. 13 has the same main structure as the first embodiment shown in FIG. 1. FIG. 13 shows an engine 1, which is a driving source of a vehicle, a gear type transmission 2, a first clutch 3a, a second clutch 3b, a final gear 7, a differential 8, a driving wheel 9, and a brake actuator 10.

The first clutch 3a is used for gear trains of even gears (2nd gear, 4th gear, and 6th gear) and a reverse gear position. Incidentally, total gear trains of the gear type transmission 2 is comprised of six forward gear positions and one reverse gear position. The second clutch 3b is used for odd gears (1st gear, 3rd gear, and 5th gear). Driving torque produced in the engine 1 is inputted to the gear type transmission 2 via the first clutch 3a or second clutch 3b, and transferred via a predetermined gear train, a shaft corresponding to each gear position, the final gear 7 and differential 8 to the driving wheel 9. The brake actuator 10 is controlled, so that a braking force of the vehicle can be changed without an operation of a brake by a driver.

As detail of the gear type transmission is the same as that shown in FIG. 2, the detail is not explained.

As shown in FIG. 13, the electronic control system includes a transmission 100, an engine control apparatus 200, and a distance between vehicles-control apparatus 500. Among these three control apparatuses, various data can be communicated to each other by use of two-way data communications.

As the transmission control system and the engine control system are the same as FIG. 1, detail of the systems is not explained.

The distance between vehicles-control system includes a radar apparatus 501, a speed sensor 502, and a switch 503 for distance between vehicles control. The radar apparatus 501 senses the distance between one's vehicle and the one ahead, and outputs the sensed signal to the control apparatus 500. The speed sensor senses a speed of the wheel, and outputs the sensed signal to the control apparatus 500. The switch 503 senses a driver's intention of executing a control for the distance between vehicles, and outputs the detected signal to the control apparatus 500.

When the control for the distance between vehicles starts by an operation of the switch 503, the control apparatus 500 controls the vehicle so that the distance between vehicles sensed in the radar apparatus 501 follows a previously set distance. Concretely, when a required torque instruction for the distance is sent to the engine control apparatus 200, the engine control apparatus 200 operates the electronic throttle apparatus 6 or changes an ignition time in accordance with the received required torque instruction. Then, driving torque produces by the engine 1 is increased or decreased. When the engine control apparatus 200 receives a shifting instruction, the engine control apparatus 200 operates the clutch actuator 4 and the shift actuator 5 in accordance with the received shifting instruction to achieve the shifting.

When the control for the distance between vehicles is being executed, the driver can not operate the accelerator and brake, but the control apparatus 500 for the distance between vehicles automatically controls a driving force and a braking force of the vehicle. When the distance is controlled as described above, a control response to the deceleration is more important. Therefore, in the transmission control apparatus 100, when being determined that the control for the distance between vehicles is being executed, the pre-shift gear position is in a position for the down shift standby.

The transmission control apparatus 100 is controlled as described above, so that the control response to the deceleration during the distance between vehicles can be improved, and the vehicle can be controlled to be more safe.

FIG. 14 is a flow chart showing main processes of the transmission control apparatus 100 of the second embodiment of the present invention. In Step S41, a signal of the switch 503 for the distance between vehicles is received from the control apparatus 500 by use of the two-way communications to determine whether the control for the distance between vehicles is being controlled. When the determination is NO, the flow goes to Step S42, and the normal pre-shift gear selection control shown in FIG. 7 is done. When the determination is YES, the flow goes to Step S43, and the down shift standby is always executed regardless of a driving condition of the vehicle, such as an amount of an operation by a driver and a vehicle speed. In Step S45, it is determined whether to execute the up shift standby. When the determination is YES, the flow goes to Step S46. When the determination is NO, the flow goes to Step S47. In Step S46, the pre-shift gear position is calculated by incrementing the current gear position. In Step s47, it is determined whether to execute the down shift standby. When the determination is YES, the flow goes to Step S48, and the pre-shift gear position is calculated by decrementing the current gear position. Then, the process flow for the pre-shift gear selection is complete.

The main processes of the transmission control apparatus 100 is structured as described above, so that the control response to the deceleration during control of the distance between vehicles can be improved, and the vehicle can be controlled to be more safe.

This embodiment is summarized below.

(1) The structure of the vehicular control apparatus for the vehicle having the twin clutch type transmission is as follows. The twin clutch type transmission has the switch function for switching between the automatic shifting mode and manual shifting mode. Then, the twin clutch type transmission operates the multiple gear trains selected by the gear selection apparatus to connect between the output shaft of the selected clutch (which is connected to the output shaft of the engine) and the output shaft of the transmission. Then one of the clutches is engaged, and another is disengaged to form a desired gear position. The vehicular control apparatus has the pre-shift gear selection section and the external information acquisition section. The pre-shift gear selection section connects an output shaft of the currently non-used clutch (disengaged clutch) and the output shaft of the transmission to each other via a predetermined gear train to be predicted as the next gear position, and makes the next gear shifting standby. The external information acquisition section acquires external information required for vehicle traveling. In case of the manual shifting mode, the pre-shift gear selection section selects a predetermined gear train for the pre-shift in accordance with the acquired external information. In this structure, an accuracy of prediction about the shifting in the manual shifting mode can be improved, and a delay of the shifting due to failure of the pre-shift gear selection can be kept down.

(2) In (1), the external information acquisition section preferably comprises at least one of the navigation apparatus, a radar apparatus, a camera apparatus, and a communication device for communicating with the external system outside the vehicle. In this structure, an accuracy of prediction about the shifting in the manual shifting mode can be improved, and a delay of the shifting due to failure in the pre-shift gear selection can be kept down.

(3) In an automatic transmission having features similar to that of (1), the pre-shift gear selection section has the first pre-shift gear selection section executed in the automatic shifting mode and the second pre-shift gear selection section executed in the manual shifting mode.

(4) In an automatic transmission having features similar to that of (1), in the manual shifting mode, the external information about the vehicle transmission control is acquired, and a predetermined gear train is selected for the pre-shift in accordance with the external information. Thereby, the output shaft of the clutch not being used for the current gear shifting and the output shaft of the transmission are connected to each other for making the next predicted gear position standby.

What is claimed is:

1. A vehicular control apparatus for a vehicle having a twin clutch type automatic transmission, the control apparatus comprising:
an external information acquisition apparatus for acquiring external information required for vehicular transmission control;
an input section for taking in the external information from the external information acquisition apparatus; and
a pre-shift gear selection section for selecting a predetermined gear train among plural gear trains of the transmission to execute a pre-shift in accordance with the external information.

2. The vehicular control apparatus according to claim 1, wherein the automatic transmission is configured so that an output shaft of one of two clutches, whose input shafts are respectively connected to an output shaft of an engine as power source, is selectively connected to an output shaft of the transmission by selecting one of plural gear trains between output shafts of the two clutches and the output shaft of the transmission, and one of the clutches is engaged and another is disengaged to achieve a desired gear position.

3. The vehicular control apparatus according to claim 2, wherein the pre-shift is executed by making a next predicted gear position standby during vehicle traveling, by connecting an output shaft of a currently disengaged clutch of the twin clutches to the output shaft of the transmission via a predetermined gear train, which is the one different from a currently used gear train between a currently engaged clutch and the output shaft of the transmission for gear shifting.

4. The vehicular control apparatus according to claim 1, comprising a shifting mode switch section for switching between an automatic shifting mode and a manual shifting mode,
wherein the pre-shift gear selection section executes the pre-shift in accordance with the external information when the shifting mode is the manual shifting mode.

5. The vehicular control apparatus according to claim 4, wherein the pre-shift gear selection section comprises a first pre-shift gear selection section executed in the automatic transmission mode and a second pre-shift gear selection section executed in the manual transmission mode.

6. The vehicular control apparatus according to claim 1, wherein the external information acquisition section is at least one of a navigation apparatus, a radar apparatus, a camera apparatus, and a communication section for communicating with an external system outside the vehicle.

7. A vehicular control method for controlling a vehicle having a twin clutch type automatic transmission, the method comprising the steps of:
acquiring external information required for vehicular transmission control; and
selecting a predetermined gear train among plural gear trains of the transmission for executing a pre-shift in accordance with the external information.

8. The vehicular control method according to claim 7, wherein said control method is applied for the following automatic transmission, which is configured so that an output shaft of one of two clutches, whose input shafts are respectively connected to an output shaft of an engine as power source, is selectively connected to an output shaft of the transmission by selecting one of plural gear trains between clutch output shafts and the output shaft of the transmission, and one of the clutches is engaged and another is disengaged to achieve a desired gear position.

9. The vehicular control method according to claim 8, wherein the pre-shift is executed by making a next predicted gear position standby during vehicle traveling, by connecting an output shaft of a currently disengaged clutch of the twin clutches to the output shaft of the transmission via a predetermined gear train, which is the one different from a currently used gear train between a currently engaged clutch and the output shaft of the transmission for gear shifting.

10. The vehicular control method of claim 7,
further comprising an automatic shifting mode for automatically controlling an operation of the transmission and a manual shifting mode for manually operating the transmission,
wherein prior to executing the pre-shift, selecting one of an automatic shifting mode and a manual shifting mode by switching operation, and
executing the pre-shift in accordance with the external information when the sifting mode is the manual shifting mode.

* * * * *